(12) United States Patent
Bissett et al.

(10) Patent No.: US 7,873,951 B1
(45) Date of Patent: Jan. 18, 2011

(54) AUTOMATED OBJECT DELEGATION

(75) Inventors: Robert K. Bissett, Peabody, MA (US);
Ryan C. Shoemaker, Acton, MA (US);
Ryan S. O'Connell, Chester, NH (US);
Kyle T. Grucci, Southwick, MA (US)

(73) Assignee: Oracle America, Inc., Redwood City, CA (US)

( * ) Notice: Subject to any disclaimer, the term of this patent is extended or adjusted under 35 U.S.C. 154(b) by 839 days.

(21) Appl. No.: 11/832,102

(22) Filed: Aug. 1, 2007

(51) Int. Cl.
*G06F 9/45* (2006.01)

(52) U.S. Cl. .................. 717/151; 717/101; 717/120; 717/136

(58) Field of Classification Search .................. 717/151
See application file for complete search history.

(56) References Cited

U.S. PATENT DOCUMENTS

| | | | | |
|---|---|---|---|---|
| 5,515,536 A | * | 5/1996 | Corbett et al. | 719/315 |
| 5,615,333 A | * | 3/1997 | Juettner et al. | 714/38 |
| 5,684,955 A | * | 11/1997 | Meyer et al. | 719/316 |
| 5,960,197 A | * | 9/1999 | Segnan | 717/116 |
| 6,044,224 A | * | 3/2000 | Radia et al. | 717/162 |
| 6,957,417 B2 | * | 10/2005 | Turner et al. | 717/108 |
| 7,373,639 B2 | * | 5/2008 | Halstead et al. | 717/140 |
| 7,401,327 B2 | * | 7/2008 | Halstead et al. | 717/140 |
| 7,426,730 B2 | * | 9/2008 | Mathews et al. | 718/104 |
| 2005/0216885 A1 | * | 9/2005 | Ireland | 717/108 |

OTHER PUBLICATIONS

Hall, R. J. "Call path refinement profiles", Software Engineering, IEEE Transactions on, vol. 21, issue 6, 1995, pp. 481-496.*
Kojima et al. "Parsing graphic function sequences", Visual Languages, 1991., Proceedings. IEEE Workshop on, Publication Year, 1991, pp. 111-117.*

* cited by examiner

*Primary Examiner*—Thomas K Pham
(74) *Attorney, Agent, or Firm*—Brooks Kushman P.C.

(57) ABSTRACT

A Java code directive automatically defines the fields declaring methods in delegation objects such that the compiler generates the corresponding delegation signatures and/or headers. The configurations define a predetermined sequence, or annotation, of compiler interpreted instructions to identify a class as a delegation class from an invoking object, and generate the required signature, or header in the invoking object. The resulting signature satisfies the compiler restriction to implement each method in the delegation class. Particular methods for which a specific implementation is desired may then be superceded or supplemented by specific coded instructions in the invoking object. In this manner, a developer need not manually code the implementation, or signature (so-called "boilerplate code), for each method in a delegated object (class).

20 Claims, 7 Drawing Sheets

AUTOMATED OBJECT DELEGATION

BACKGROUND

A software development environment employs a variety of compilers, tools, and file organizing mechanisms to define and develop computer software. Typically a set of source files defines a software product or application, and undergo a series of transformations from a human readable source code into a machine executable format. A modern software development environment employs an object based approach that identifies classes codified in code files. Each class includes operations, or methods, for performing application tasks for a software application. The software application produces or generates a particular result from the logic-driven execution of the methods.

The classes in such an object based architecture inherit behaviors from parent classes to efficiently generate classes without redundant or repetitive code files. Classes are instantiated into objects via a compilation and build process to generate the executable application, as is known in the art. In a large system, such inheritance results in complex interrelations between the classes in a so-called inheritance hierarchy. Certain processing restrictions may limit or impose rules on inheritance capabilities for certain languages or platforms. While inheritance allows a class (i.e. code object) to inherit methods from another class for purposes of invoking methods in the inherited class (so-called extending the class), potential inconsistencies or processing restraints may result. For example, the popular Java® language prohibits extending multiple classes.

Therefore, when a class is compiled or interpreted to transform the human readable source code into machine executable instructions, the inheritance hierarchy is employed and traversed. Compiling and linking functions generate objects corresponding to the classes for performing the application tasks. Such compilations flag improper or disallowed inheritance. In a large software application, complex inheritance patterns may be problematic, and result in reworking or restructuring the class files to accommodate the build and compile class constraints. Often, remedial actions involve code sequences that duplicate or parallel method signatures (headers) or definitions. Such redundant code is sometimes referred to as "boilerplate" code.

SUMMARY

Software development environments employing object architectures develop software applications including many objects, each defined by a class code file, potentially capable of inheriting behaviors from other classes according to an inheritance hierarchy. In a large application, the number of inheritance interrelations between classes forms a complex and potentially problematic arrangement. Conventional object based (object oriented) architectures suffer from the shortcoming that conventional class inheritance may be limited or produce inconsistencies and/or ambiguities that cause compilation errors, runtime anomalies, and unpredictable operation. Such inconsistencies may require additional code in the form of interfaces, delegation, and extension of objects to accommodate constraints of compiling and building.

Configurations herein are based, in part, on the observation that otherwise trivial, repetitive code is often required to duplicate items such as headers and signatures when one object invokes, inherits, or otherwise calls or uses another object. For example, in a Java based object, delegation may be employed by one object to invoke a separate object to perform particular methods. However, semantics require that the invoking object account for every method in the invoked object (delegate), regardless of the methods (operations) actually employed. Accordingly, additional code must be written to satisfy the compiler and itemize an implementation (typically a routine header, or signature) for each method in the delegate object. Therefore, boilerplate code is developed to satisfy many method definitions even if only one method is to be invoked. In particular, when using a so-called facade or proxy design pattern to have an object delegate method calls to other object(s), the developer must write tedious and error-prone code to match each method in the delegate object(s). It would be beneficial to provide a mechanism that would allow the developer to add a directive to automatically define the delegate objects such that the compiler generates the corresponding delegation signatures.

The configurations disclosed herein substantially overcome these shortcomings by defining an annotation that identifies delegate object(s) declared within the invoking object and generates the required method signature within the invoking object. The resulting signatures satisfy the compiler restriction to implement each method in the delegation class. Particular methods for which a specific implementation is desired may then be superceded or supplemented by specific coded instructions in the invoking object. In this manner, a developer need not manually code the implementation of each delegated method (so-called "boilerplate code).

It is not intended that the method, system and apparatus for generating delegation code structures be summarized here in its entirety. Rather, further features, aspects and advantages of generating delegation code structures are set forth in or are apparent from the following drawings, detailed description and claims which follow.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
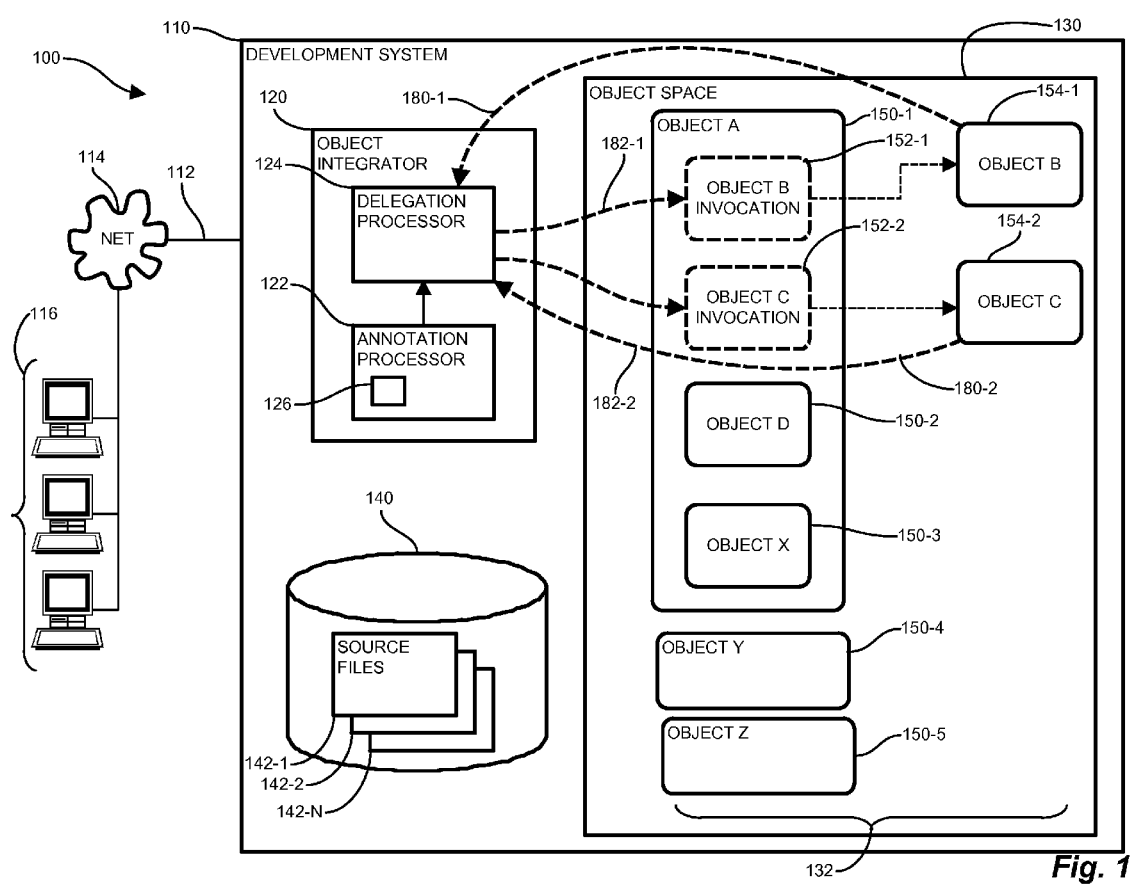
FIG. 1 is a context diagram of an exemplary software development environment suitable for use with the present invention.

In a software development environment, particularly in a Java development environment, relations between classes (or objects) is a paramount feature. The classes or objects hereinafter referred to as classes) interrelate with other objects via inheritance, inclusion, and delegation, to name several interrelation vehicles. Often, these interrelations may result in repetitive, redundant, or duplicate definitions of methods and operations, resulting in so-called "boilerplate" code. Such boilerplate code, although required by the software architecture employed, lends itself well to automated generation, thus avoiding development resources to generate such boilerplate code. An annotation feature assists in development of code features based on a template or model segment of code, and may be parameterized to facilitate applicability throughout code generation (compilation, linking or binding, collectively called building). In particular, delegation is an interrelation vehicle that allows one class to define and invoke a method implemented (actually executed or performed) in another class. Configurations below disclose a delegation annotation that generates a set of method definitions employed when delegating methods from one object to another object.

A class receiving a request may either handle the request or pass the request on to another class to do the actual work. The class receiving the request invokes a method to handle the request, either by forwarding or performing the processing directly. In this manner, it is said to implement the method, whether by delegation or by direct processing. In particular arrangements, one mechanism for invoking a method in another class is referred to as a delegation. However, in either case, the invoking class requires at least some boilerplate code to define a method signature and identify the delegation framework.

In a particular configuration, a delegation employs a so-called façade or proxy design pattern, as is known in the art. When using the facade or proxy pattern, a class A aggregates other classes B, C, etc., which do work (perform executable instructions) for class A. This is similar to having class A extend another class, in which case class A inherits all the methods of the parent object. But inheritance may not be desirable, and extending multiple classes is not allowed in many object oriented languages (e.g., Java). With delegation, class A contains some or all of the same methods as B, C, etc., but calls the methods inside the other classes to do the work (i.e. execute the code instructions). Following is a Java example:

```
public class B {
    public void method1(String s) { }
    public int method2( ) { }
}
public class A {
    // A delegates some methods to B
    B b=new B( );
    public void method1(String s) {
        b.method1(s);
    }
    public int method2( ) {
        return b.method2( );
    }
    /* any other methods of A . . . */
}
```

This example employs one class to which method calls are delegated, and only includes two methods in class B. With multiple delegate classes containing multiple methods each, the code becomes large quickly. An @Delegate annotation, disclosed herein, defines a delegation class and generates the delegation definitions (the so-called "boilerplate" code) for the delegation class. With the Delegate annotation, class A could be written as:

```
public class A {
    @Delegate
    B b=new B( );
    /* any other methods of A . . . */
}
```

The compiler would then generate the other methods as needed. While this example uses the @Delegate annotation in its simplest form, implementations of the annotation could also include parameters to control whether only public methods are included or not, any methods to exclude, etc.

Configurations discuss further below mitigate coding effort for developers for redundant and repetitive code sequences. While some conventional tools, such as Integrated Development Environments, may provide the functionality to generate the delegation code for the user, a language annotation as disclosed herein is more efficient. FIG. 1 is a context diagram of an exemplary software development environment suitable for use with the present invention. Referring to FIG. 1, the software development environment 100 includes a development system 110 having an object integrator 120, object space 130, and a repository 140 for storing source files 142-1 . . . 142-N (142 generally). As in most modern computer systems, the development system 110 also includes an interface 112 to a public access network 114 such as the Internet for communication with remote nodes 116 for deployment, remote invocation, and the like.

A code developer or software engineer employing configurations of the invention disclosed herein produces source files 142 that are compiled or interpreted into objects 132 in the object space 130, typically a memory of the development system 110. Objects 132 executing in the object space 130 perform processing for completing the work or tasks that are the intended purpose of the application or software system being developed, deployable on other nodes 116 in the network. As is known in the art, the objects 132 are instantiated entities compiled or interpreted from the source files 142 (source code), and include a sequence of instructions and data executable by a processor for performing work that is the desired result of the application, task or toolkit that the objects collectively define.

The object integrator 120, which may include the functionality of a compiler or interpreter, generates the executable objects 132 from the source files 142. Depending on the inheritance hierarchy (i.e. structure) of the various objects 150-1 . . . 150-N (150 generally), particular objects 150 may include other objects (e.g. 150-1 includes 150-2 and 150-3). Objects 150 also delegates to other objects 154-1 . . . 154-2 (154 generally), meaning that the object 150-1 invokes the delegated object 154-1, 154-2 to perform the actual work. Configurations herein substantially overcome the above indicated shortcomings of conventional delegation by generating an object invocation 152-1,152-2 (152 generally) for identifying, or "implementing" the delegated object 154. As will be shown further below, each delegated object 154 may include many operations, or methods (162, FIG. 3) that become unwieldy to manually identify. In this manner, the invocation 152 provides generated code, or instructions, within a delegating object 150 to identify delegated methods and allow subsequent invocation of the delegated methods, also discussed further below.

In operation, such delegation is identified as a code directive (e.g. statement in the source file 142) to generate an invocation 152 for a delegated object 154. An annotation processor 122 identifies the code directive and a delegate object 154, typically designated or corresponding to a source file 142. The annotation processor 122 is operable generally to map particular directives to predetermined sequences 126 of code or instructions, and to insert the predetermined sequence 126 in the resulting object 150. The annotation processor 122 identifies the particular predetermined sequence 126, which may emanate from another source file 142. The annotation processor 122 invokes the delegation processor 124 with the predetermined sequence 126 to generate the object invocation 152 corresponding to the delegated objects 154. The delegation processor 124 receives the delegated objects 154 as parameters, shown as arrows 180-1, 180-2, and generates invocations 152 by processing each of the objects 154 and methods therein according to the predetermines sequence 126, shown as arrows 182-1,182-2. The resulting invocations 152 include delegation instructions (i.e. code) for invoking the methods in the delegated objects 154 from the invoking object 150-1

Generally, as employed herein, "source files" refers to the human readable code file (i.e. Java, c++) which a compiler or interpreter instantiates into executable objects. Therefore, a source entity implies a corresponding (possibly multiple) object in the object space 130. The object space 130 refers generally to addressable memory (i.e. RAM) on the deployment machine for executing the instructions and storing the instantiated objects. It should be further noted that the generation of delegation code by the delegation processor 124, in the example arrangement is a compilation activity performed on the source files 142, while the subsequent instantiation of delegated objects 154 is a runtime activity performed by executing the generated delegation code. However, various linkage options and dynamic binding operations may occur that mitigate the distinction between rigid compile time and runtime operations. The methods disclosed herein are therefore applicable to compilation and execution of code based objects 132 for automating the claimed delegation processing to a delegated object 154 (i.e. class) from the invoking delegating object 150 (class).

Figure 2:
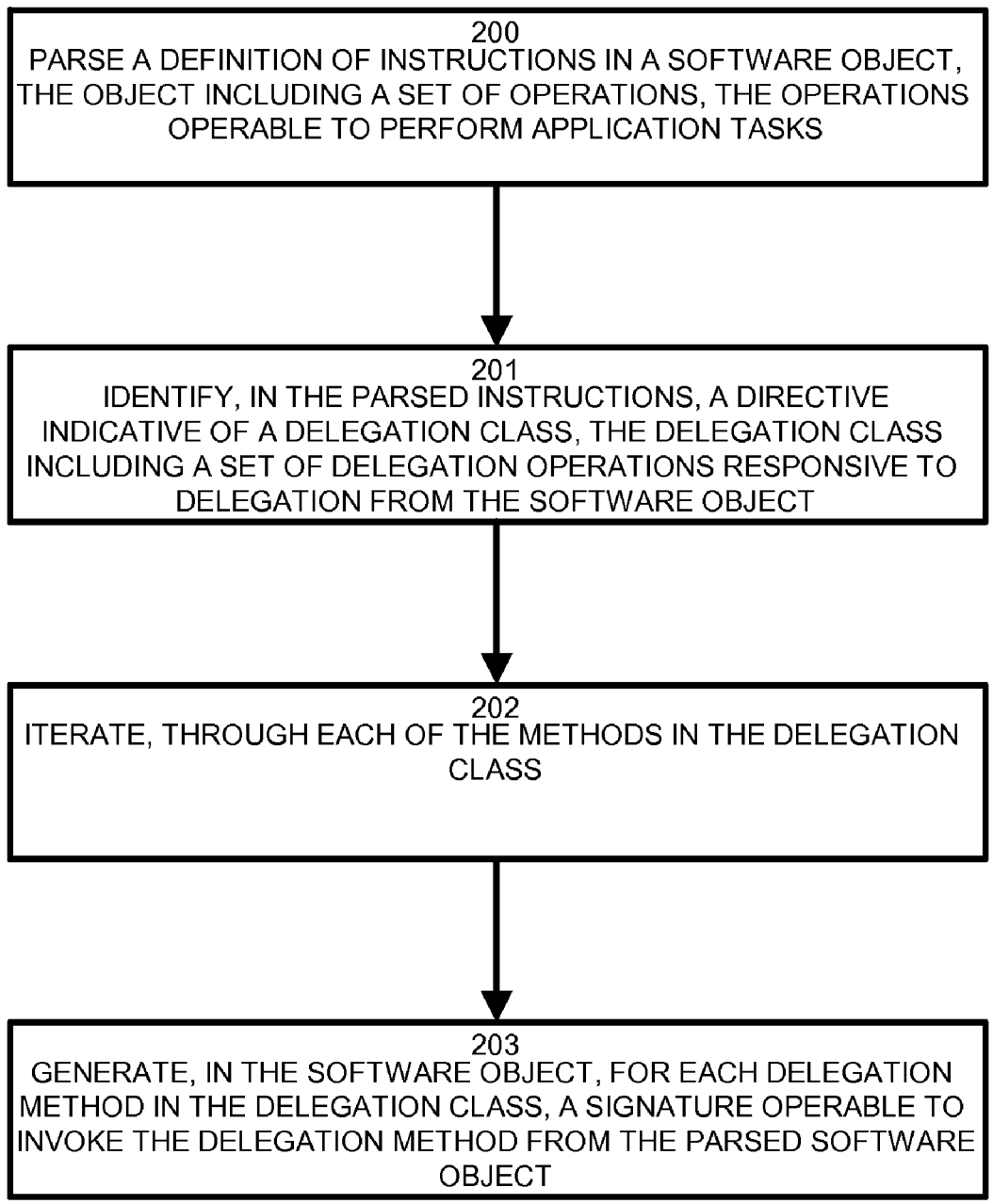
FIG. 2 is a flowchart of delegation processing in the environment of FIG. 1.

FIG. 2 is a flowchart of delegation processing in the environment of FIG. 1. Referring to FIGS. 1 and 2, the method for defining an invocation sequence in a software development environment 100 as disclosed herein includes parsing a definition of instructions in a software object 132, the object including a set of operations, the operations operable to perform application tasks, as depicted at step 200, and identifying, in the parsed instructions, a directive indicative of a delegation class 152, in which the delegation class 152 includes a set of delegation operations responsive to delegation from the software object, as shown at step 201. The software object 132 is typically represented by one or more source files 142 (e.g. code files), and the operations are indicative of methods for performing a particular processing task (e.g. work). The directive is a parseable keyword in the source code that the compiler interprets as pointing to an annotation. The annotation contains the instructions to be inserted or applied at the location of the directive in the source file 142, and are defined in the predetermined sequence 126.

The object integrator 120, or other compile or build entity, iterates through each of the methods in the delegation class 152 to determine the methods operable for delegation, as depicted at step 202. Having identified the directive as a delegation directive, the delegation processor 124 generates, in the software object 150, for each delegation method in the delegation class 152, a signature operable to invoke the delegation method from the parsed software object 150, as shown at step 203. The generated signature is the invocation sequence of code operable to invoke the delegated method from the delegation object 152. Therefore, the delegation directive applied to a delegated object 154 (typically a class defined by the source files 142) results in the delegation processor 124 generating a signature for each method in the delegating class 152 for invoking each of the methods in the delegate object 154.

Figure 3:
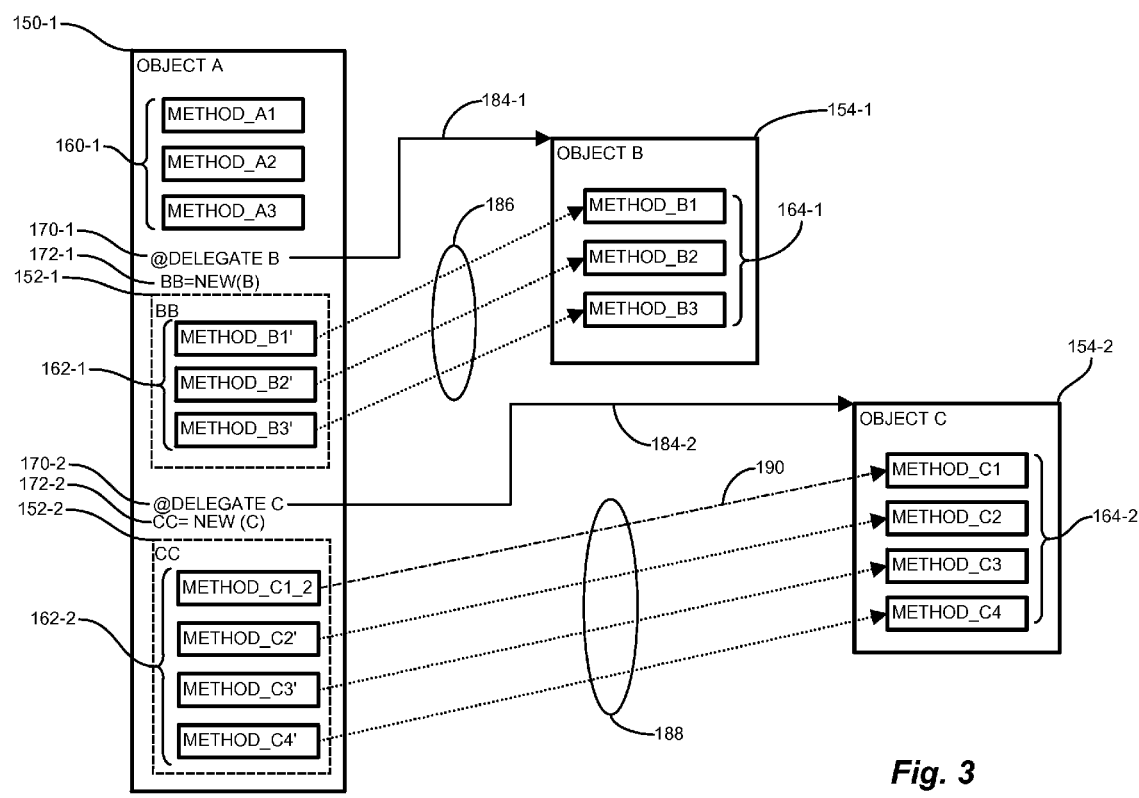
FIG. 3 is a block diagram of object delegation employing the processing of FIG. 2.
Figure 4:
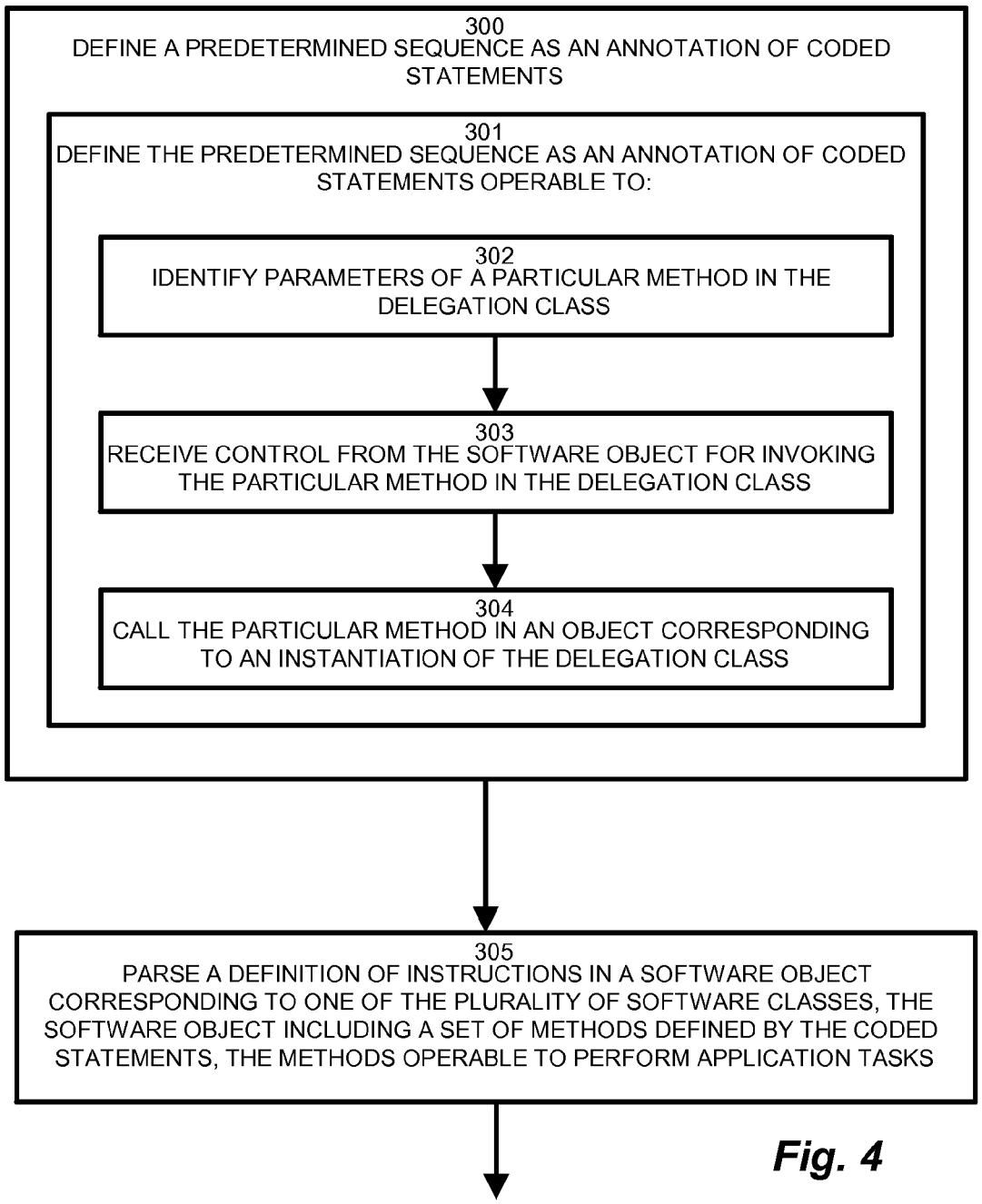
FIGS. 4-7 are a flowchart of delegation code generation in the system depicted in FIG. 3.
Figure 5:
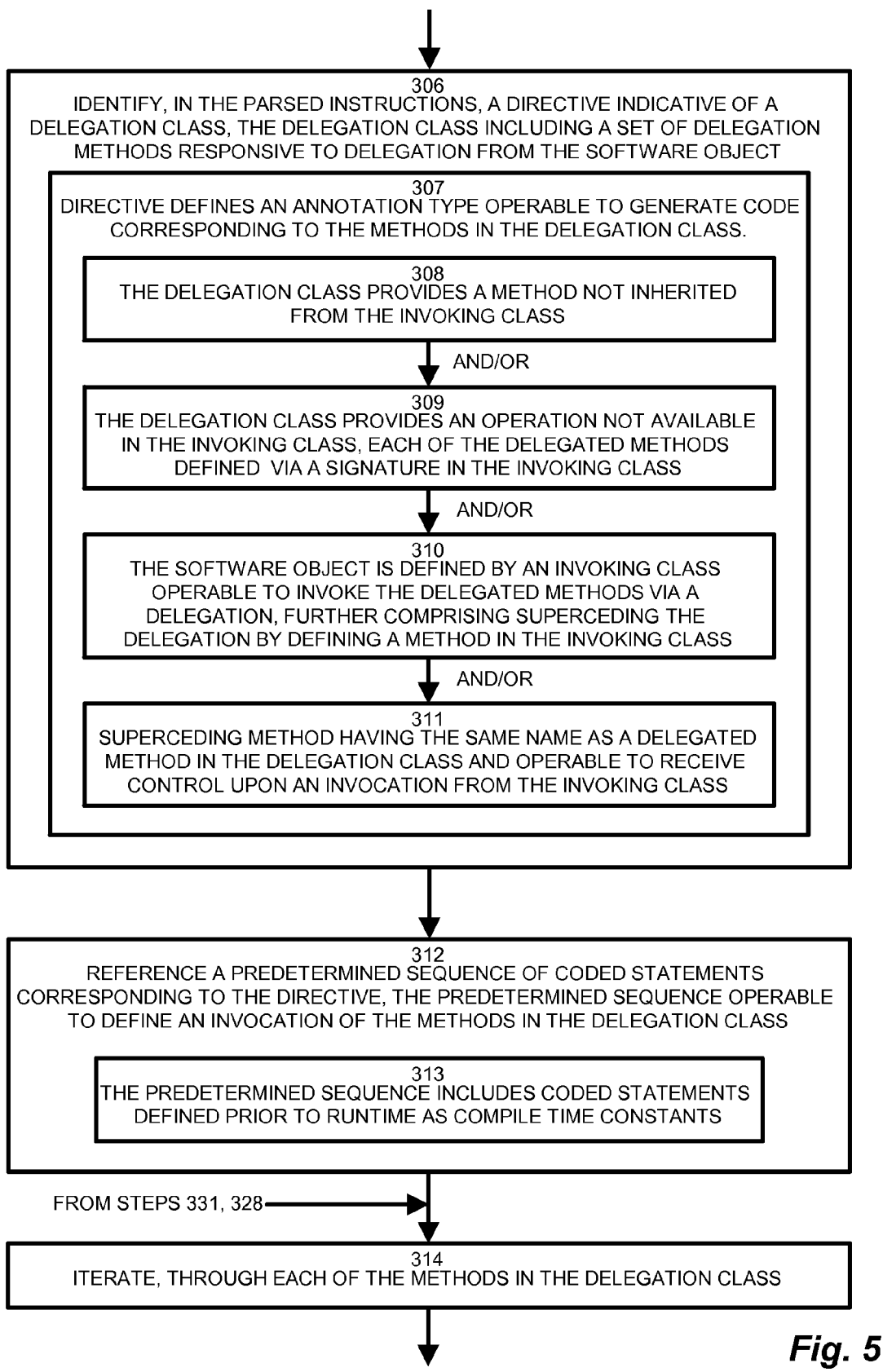
Figure 6:
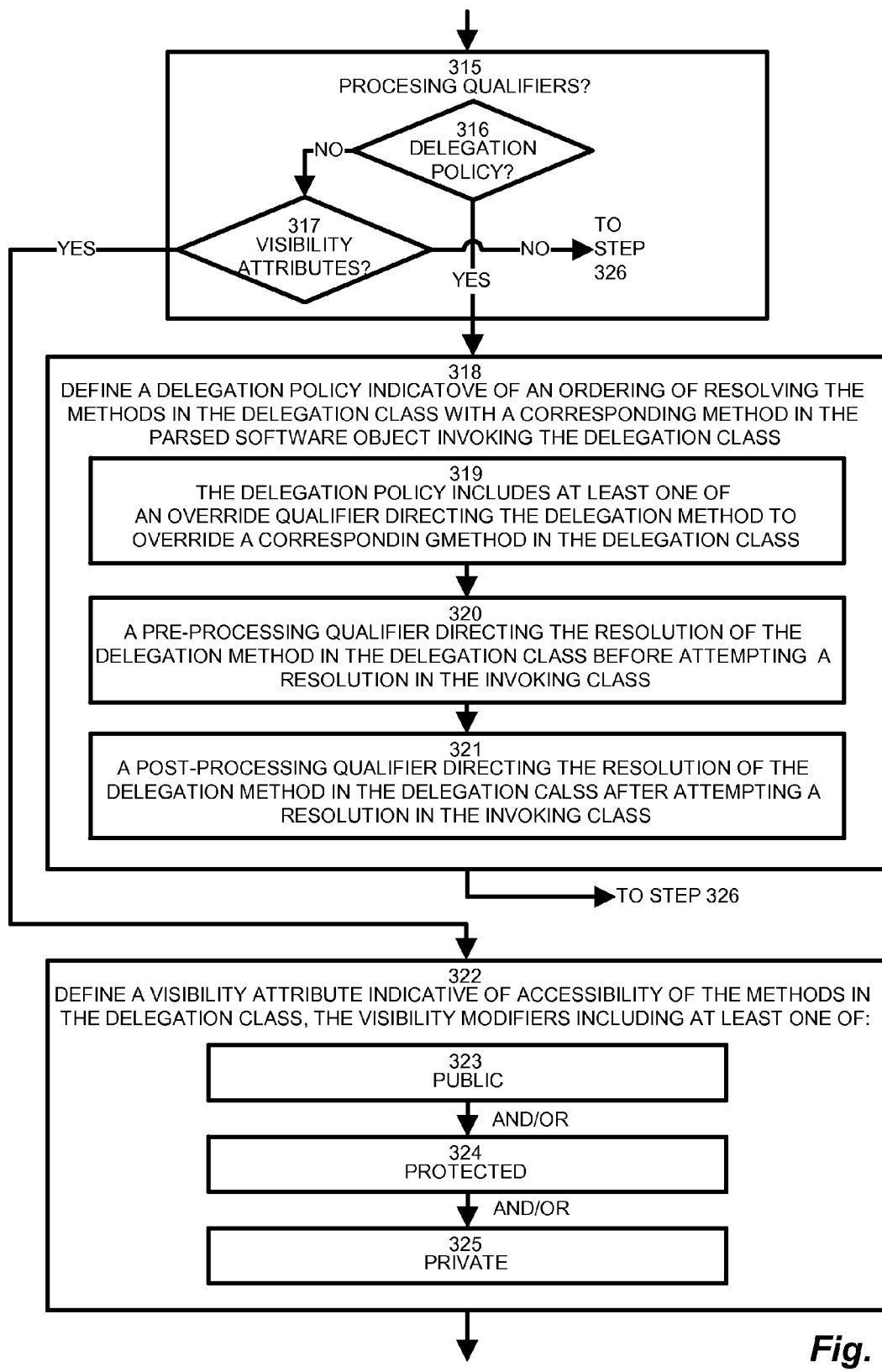
Figure 7:
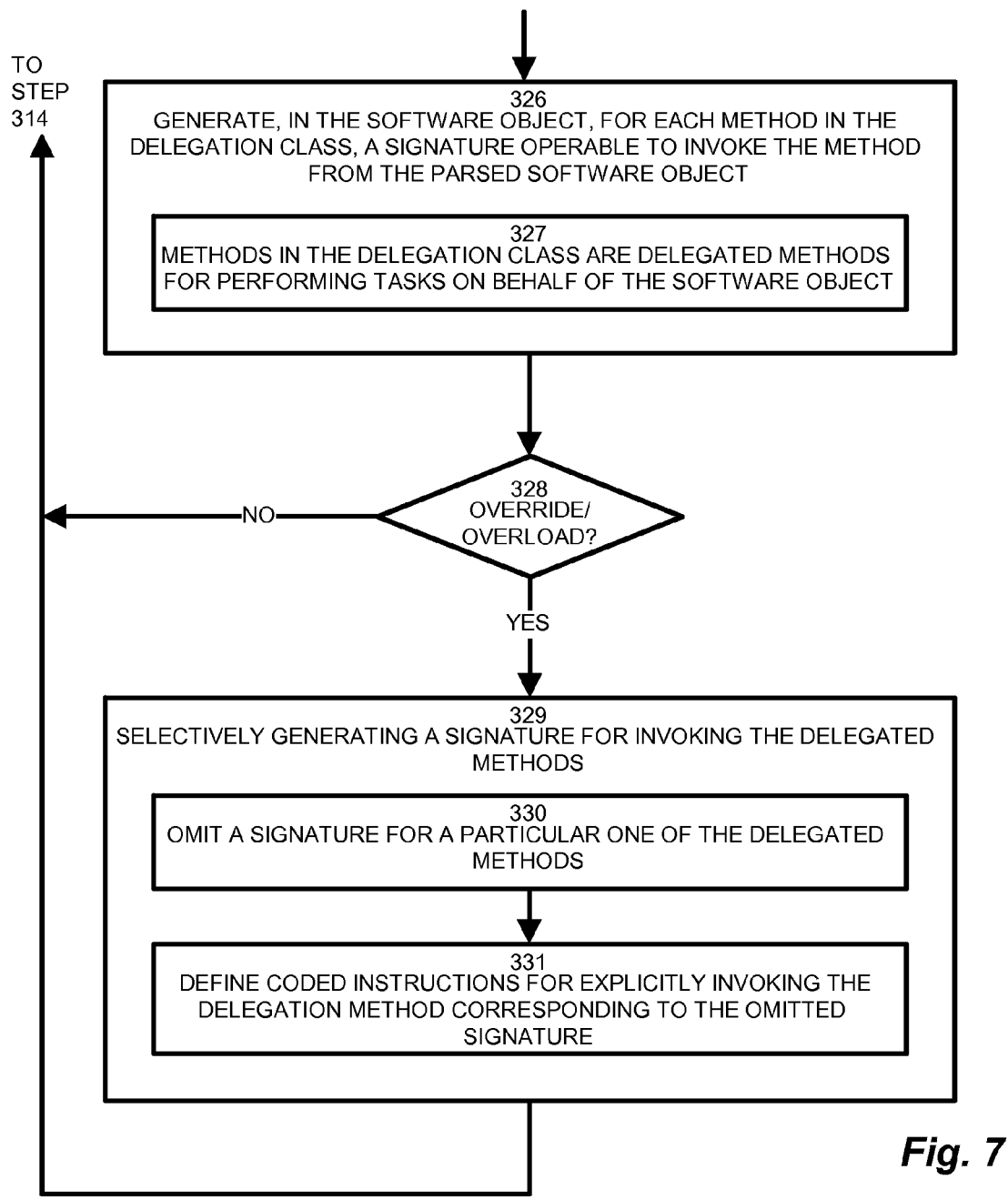

FIG. 3 is a block diagram of object delegation employing the processing of FIG. 2. Referring to FIGS. 1 and 3, the object integrator 120 initiates processing the source code file 142 that defines object a 150-1. Processing includes an appropriate build sequence, typically a compilation and linking and/or binding operation, as is known in the art. During processing, the object integrator 120 encounters (i.e. parses) code definitions for object A 150-1, including native methods A1, A2 and A3 (160-1). The object integrator 120 identifies an annotation directive 170-1, and defers control to the annotation processor 122. The annotation processor 122, typically responsible for a plurality of annotation sequences, matches the @DELEGATE directive 170-1 and identifies it as corresponding to a predetermined sequence 126 of delegation instructions. The annotation processor 122 invokes the delegation processor 124 to carry out the specific predetermined sequence 126 specified by the @DELEGATE 170-1 delegation instructions 126. The delegation processor 125 receives the code fragment 172-1 as a parameter for instantiating a delegation object BB 152-1 for delegation. The delegation processor 124 parses a source file 142 corresponding to object B 154-1, shown by arrow 184-1, to identify each of the methods in the object 154-1 to be delegated from object A 150-1. The delegation processor 124 instantiates object BB 152-1 within object A 150-1, including only delegation signatures 162-1 for invoking, via delegation, the methods B1, B2 and B3 164-1 in object B 154-1. A subsequent call to method B1, B2 or B3 162, such as from methods A1, A2 or A3 160-1 for example, is performed by invoking methods B1', B2' or B3' 162-1, which delegate the actual processing to the delegated object B and corresponding methods 164-1, as shown by arrows 186.

The object integrator 120 encounters the delegation directive 170-2 applicable to the instantiation 172-2 of delegation object CC 152-2. Accordingly, the delegation processor 124 applies the @Delegate predetermined sequence 126 of processing instructions to each of the methods METHOD_C1, METHOD_C2, METHOD_C3 and METHOD_C4 164-2 in object C 154-2, as shown by arrow 184-2. Each of the methods METHOD_C2, METHOD_C3 and METHOD_C4 are invoked by delegation signatures METHOD_C2', METHOD_C3' and METHOD_C4' respectively, shown by arrows 188. However, additional code is added in METHOD_C1_2 prior to delegation to METHOD_C1, as shown by arrow 190. Thus, the delegation signature 162 generated by the delegation instructions 126 defines a delegation to the methods 164 in the delegated object, but may be further specialized in the delegating object CC by method overloading and precedence operations, discussed further below.

FIGS. 4-7 are a flowchart of delegation code generation in the system depicted in FIG. 3. Referring to FIGS. 3-7, at step 300, a code definition is developed that defines the predetermined sequence 126 as a set of coded instructions. The resulting predetermined sequence, in a particular configuration, is an annotation of coded statements, as depicted at step 301. Such annotations are code devices recognized by the compiler or interpreter for compile time expansion. The predetermined sequence 126 is operable to identify parameters of a particular method in the delegation class 154, as shown at step 302, receive control from the software object 150 for invoking the particular method 164 in the delegation class 154, as depicted at step 303, and call or invoke the particular method 164 in an object corresponding to an instantiation of the delegation class 154, as disclosed at step 304.

The object integrator 120, or other compiling entity, parses a definition of instructions in a software object 150 corresponding to one of the plurality of software classes 132, in which the software object 150 includes a set of methods 160, 164 defined by the coded statements, such that the methods are operable to perform application tasks of the particular application being compiled, as shown at step 305. A typical compilation involves parsing many source files 142 which are integrated with each other via inheritance, inclusion, delegation, and other coding structures.

In the course of parsing, the object integrator 120 identifies, in the parsed instructions, a directive 170 indicative of a delegation class 154, the delegation class including a set of delegation methods 164 responsive to delegation 186, 188 from the software object 150, as disclosed at step 306. In the example configuration discussed, the directive 170 defines an annotation type, in which the annotation type is operable to generate code 152 corresponding to the methods 164 in the delegation class 154, the predetermined sequence 126 of instructions further operable for receiving annotated values 172 corresponding to compile time constants, as depicted at step 307.

In processing the @Delegate annotation instructions 126 by the annotation processor 122, the delegation class 154 provides a method 164 that is not inherited by the invoking class 150, since the actual execution (work) is still performed by the delegated method 164, as shown at step 308. Had the invoking object 150 been required to inherit the delegated method 164, object A 150 then actually executes the method and incurs overhead associated with inheritance. Such overhead may include compilation conflicts with multiple inheritance (not allowed in some languages), conflicts with similarly named methods, and other complexities triggered by the inheritance relationship. The delegation class 154 provides an operation, or method 164, not available in the invoking class 150, such that each of the delegated methods 164 are defined via a signature 162 in the invoking class 150, as shown at step 310. The signature 162 generally includes the method name and parameters, and usually a return value or reference, however such calling sequences may vary somewhat in implementation from language to language. The software object A 150 is defined by an invoking class codified in the source files 142, and is operable to invoke the delegated methods 164 via a delegation 184, 188, and may further include superceding the delegation 190 by defining a method METHOD_C1_2 in the invoking class 152-2, as shown at step 310. The METHOD_C1_2 may perform additional work (coded instructions) before calling the delegated METHOD_C1 or may be an entirely separate set of instructions, as discussed at step 315 (below) with respect to precedence and overloading.

In such a case, the software object A 150 is defined by an invoking class operable to invoke the delegated methods 164 via a delegation 186, 188, and further includes defining a superceding method 162 in the invoking class 152, such that the superceding method has the same name as a delegated method 164 in the delegation class 154 and is operable to receive control upon an invocation from the invoking class 150, as depicted at step 311. Therefore, the overloaded or superceding local method 162 employs the same name as the delegated method 164 such that when the object integrator compiles, it resolves the invocation via the local method 162 by evaluating prior to attempting to resolve references in the delegated objects 154.

To process the @Delegation directive 170, the delegation processor 124 references a predetermined sequence 126 of coded statements corresponding to the directive 170, such that the predetermined sequence 126 is operable to define an invocation 186, 188 of the methods 164 in the delegation class 154, as shown at step 312. By employing the annotation construct via the annotation processor 122, the predetermined sequence 126 includes coded statements defined prior to runtime as compile time constants, as shown at step 313.

Having identified the @delegate annotation directive 170 and corresponding sequence of instructions 126, the delegation processor 124 begins iterating, through each of the methods 164 in the delegation class 154, as depicted at step 314, according to the delegation sequence (statements) 126. In particular configurations, the @Delegate sequence includes processing qualifiers, as depicted at step 315. The disclosed qualifiers are exemplary; additional qualifiers may be apparent in view of principles of compilation and interpretation known in the art. Accordingly, a check is performed, at step 316, to determine if a delegation policy is specified in the directive 170.

If a delegation policy qualifier is specified, then such a policy is indicative of an order of resolving the methods 164 in the delegation class with a corresponding method 160 in the parsed software object 150 invoking the delegation class 154, as depicted at step 318. If a delegation policy is specified, then such a delegation policy includes one or more of an override qualifier directing the delegation method to override a corresponding method in the delegation class, as shown at step 319, a pre-processing qualifier directing the resolution of the delegation method in the delegation class before attempting a resolution in the invoking class, as depicted at step 320, and a post-processing qualifier directing the resolution of the delegation method in the delegation class after attempting a resolution in the invoking class, as disclosed at step 321.

A further check is performed, at step 317, for a visibility attribute. This visibility attribute defines accessibility of the methods in the delegation class, as depicted at step 322. The available visibility modifiers including at least one of public visibility, as depicted at step 323, protected visibility, as shown at step 324, and private visibility, as disclosed at step 325. A public attribute indicates that the delegated method 164 is accessible to all other objects, while a private attribute indicates that the method 164 is only accessible to the object in which it is declared.

Continuing from attribute checks and processing at step 315, the delegation processor 124 generates, in the software object 150, for each method 164 in the delegation class 154, a signature 162 operable to invoke the method 164 from the parsed software object 150, as depicted at step 326. The delegation processor 124 defines each of the methods in the delegation class 154 as delegated methods 164 for performing tasks on behalf of the software object 150, as depicted at step 327. Therefore, the resulting delegation includes a signature 162 in the invoking (delegating) object 150, that, when invoked, transfers control to the actual code performing the work, defined as a method 164 in the delegated object 154. Therefore, the delegation methods 164 are invokable (callable) from the object A 150, but the actual code that is executed is in the delegated object 154.

Certain override and overload considerations may be in force, either from the qualifiers discussed above or other compilation and/or binding specifiers. Accordingly, the delegation processor 124 performs a check for each of the delegation methods 164, as depicted at step 328, to determine if a delegation method 164 is overloaded or overridden by a native definition (such as a method 160) in the invoking object 150. Accordingly, the delegation processor 124 selectively generates a signature 162 for invoking the delegated methods 164 from within object A 150, as disclosed at step 329. If a method if overridden by a local definition in object A, for example, the delegation should not occur and the delegation signature 162 for invoking the delegation method 164 will not be generated. In such a case, the delegation processor 124 omits a signature 162 for a particular one of the delegated methods 164, as shown at step 330, and the object A 150 relies on defined coded instructions (i.e. a local method in object A) for explicitly invoking the delegation method 164 corresponding to the omitted signature 162, as shown at step 331. Control then reverts to step 326 above to process each of the delegation methods 164 in the delegation class 154.

In a particular configuration, the above arrangement implements methods used by client code for returning an object that implemented a class java.util.Map, as follows: This map stored key->value pairs, such as "name"->"Bobby" or "phone"->"123" and clients would do map.put("a", "b) or map.get("a") to retrieve "b". Normally we would just use a Java class such as a typical HashMap to do this. The Map interface provides three collection views, which allow a map's contents to be viewed as a set of keys, collection of values, or set of key-value mappings. The order of a map is defined as the order in which the iterators on the map's collection views return their elements. Some map implementations, like the TreeMap class, make specific guarantees as to their order; others, like the HashMap class, do not.

General-purpose map implementation classes should provide two "standard" constructors: a void (no arguments) constructor which creates an empty map, and a constructor with a single argument of type Map, which creates a new map with the same key-value mappings as its argument. In effect, the latter constructor allows the user to copy any map, producing an equivalent map of the desired class. There is no way to enforce this recommendation (as interfaces cannot contain constructors) but all of the general-purpose map implementations in the JDK comply.

In this example, there was a need to store other information about the keys, such as which ones were visible in some cases but not in others. Specifically, we needed to have the Map methods and two more about the scope of the information so that users would implement:

map.put("a", "b);
map.getScope("a", some-other-info-here);
map.getScope("a"); // returns the proper scope If the user did not set the scope, then a default was used. If we had created a class to extend HashMap, we could have only written the couple methods that we to be invoked:

```
public class MyMap extends HashMap {
  private Map scopeMap= . . .
  // overriding a method in HashMap
  public Object put(Object key, Object value) {
    scopeMap.put(key, some-default-scope);
    return super.put(key, value);
  }
  public void setScope(Object key, Object scope) { . . . }
  public Object getScope(Object key) { . . . }
}
```

However, because of other concerns and constraints, this object had to extend another class and could not inherit all the Map methods directly. So we had to delegate all the work to an internal Map aggregated by MyMap, and had to implement every method in Map in order to compile, as shown in the following code fragment:

```
public class MyMap extends SomeOtherClass implements Map {
  private Map delegate= . . .
  private Map scopeMap= . . .
  // method we want to write
  public Object put(Object key, Object value) {
    scopeMap.put(key, some-default-scope);
    return delegate.put(key, value);
  }
  // methods we have added
  public void setScope(Object key, Object scope) { . . . }
  public Object getScope(Object key) { . . . }
  /* methods we don't want to write but have to because
  we implement Map are below */
  public void clear( ) {delegate.clear( ); }
  public Object clone( ) {return delegate.clone( )}
  public boolean containsKey(Object key) {
    return delegate.containsKey(key);
  }
  // 12 more delegating methods follow . . .
}
```

With the disclosed @Delegate annotation 170, we would not have had to write out all such boilerplate methods. Instead we could simply do:

```
public class MyMap extends SomeOtherClass implements Map {
  /* With this annotation, we only write the methods that
  we want to change like put( )*/
  @Delegate
  private Map delegate= . . .
  private Map scopeMap= . . .
  public Object put(Object key, Object value) {
    scopeMap.put(key, some-default-scope);
    return delegate.put(key, value);
  }
  // new methods we have added
  public void setScope(Object key, Object scope) { . . . }
  public Object getScope(Object key) { . . . }
}
```

The other methods in the delegate map are added automatically by the delegation processor 124 without having to be written manually.

In alternate arrangements, the @Delegate directive may encompass visibility and policy considerations. In Java, annotations are defined as Java objects, and one way to define the @Delgegate annotation object is defined below. The following code fragment example uses the Java 'enum' to restrict the values that can be specified when using the annotation, however these values may also be defined in other ways.

```
// The "@interface" means this will be an annotation
public @interface Delegate {
  // defines the valid values, such as "Policy.PRE"
  public enum Policy {OVERRIDE, PRE, POST};
  public enum Visibility {PUBLIC, PROTECTED, PACKAGE};
  // the two options that can be used and their defaults
  Policy policy( ) default Policy.OVERRIDE;
  Visibility visibility( ) default Visibility.PUBLIC;
}
```

Example Syntax:

[1] @Delegate

[2] @Delegate(policy=Delegate.Policy.OVERRIDE, visibility=Delegate.Policy.PUBLIC)

[3] @Delegate(visibility=Delegate.Visibility.PROTECTED)

Syntax Example [1] will use the defaults for both policy and visibility. Example [2] specifies both values, and is equivalent in practice to example 1 since it uses the default values. Note that splitting it into two lines of text has no effect on the behavior. Line breaks serve merely for readability. Example [3] uses the default for policy and specifies a certain value for the visibility.

Following are syntax examples illustrating the manner in which the @Delegate annotation 170 would provide using the policy and visibility options. The same class "A" and "B" examples are employed, but expand on class B. The following class B has four methods with different levels of visibility.

```
public class B {
   public String method1( ) { }
   protected void method2(int i) { }
   String method3( ) { }
   private void method4(int i) { }
}
```

Classes may be grouped into packages (similar to putting files in different folders), and the visibility modifier restricts what methods can be called by classes in other packages. Method 1 is public, and so can be called by classes in any package. Method 2 is protected, meaning that only classes in the same package as B, or classes that extend B, can call it. Method 3 uses "default" visibility, which is also sometimes called "package" visibility (we use "package" rather than "default" here to avoid confusion with the default values of the annotation options).

Private methods cannot be called by any class other than the one that defines them, so no one can call method 4 except for other methods within class B. Thus, there is no option for it in our annotation.

Package visibility is more restrictive than protected visibility, so we can say that Delegate.Visibility.PROTECTED implies protected AND public, and Delegate.Visibility.PACKAGE implies package, protected, and public. Ignoring the policy option for a moment, the three options using class B are below (the policy option would have no effect anyway since class A does not manually include any methods of class B). Note that visibility only defines which methods are generated—it doesn't imply the visibility of the generated method in class A, though that could certainly be yet a third option for the annotation.

Following is the PUBLIC case, which is also the default for the annotation:

```
public class A {@Delegate(visibility=Delegate.Policy.PUBLIC) // or "@Delegate"
   B b=new B( );
}
``` is the same as:

```
public class A {
   B b=new B( );
   public String method1( ) {
   return b.method1( );
   }
}
```

The PROTECTED case:

```
public class A {
   @Delegate(visibility=Delegate.Policy.PROTECTED)
   B b=new B( );
}
``` is the same as:

```
public class A {
   B b=new B( );
   public String method1( ) {
   return b.method1( );
   }
   public void method2(int i) {
   b.method2(i);
   }
}
```

The PACKAGE case:

```
public class A {
   @Delegate(visibility=Delegate.Policy.PACKAGE)
   B b=new B( );
}
``` is the same as:

```
public class A {
   B b=new B( );
   public String method1( ) {
   return b.method1( );
   }
   public void method2(int i) {
   b.method2(i);
   }
   public String method3( ) {
   return b.method3( );
   }
}
```

The last two cases would only compile if class A were in the same package as class B of course, which is why it would be a beneficial option for users to have.

In the class A examples above, none of the methods in B were overridden, so the policy option would have no effect. For policy examples, class A appears as above with visibility set to PROTECTED, so method1 and method2 are the only ones that the annotation processor cares about. The default case:

```
public class A {
   @Delegate(visibility=Delegate.Policy.PROTECTED,
   policy=Delegate.Policy.OVERRIDE) // same as specifying no
policy
   B b=new B( );
   public String method1( ) {
   doSomething( ); // dummy method for example
   return "hello";
   }
   public void method2(int i) {
   doSomethingElse(i); // another dummy method
   }
}
```

Since the policy is set to OVERRIDE, nothing else is generated for these methods and this example would be the same whether the annotation were present or not.

For the PRE case, the method text that was entered by the user is included before adding a call to the delegate object. For the POST case, the user's text is included after a call to the delegate object. Here are examples of method1 and method2 (without the entire class written out for simplicity):

PRE:

```
public String method1( ) {
   doSomething( );
   }
   public void method2(int i) {
   doSomethingElse(i);
}
``` becomes:

```
public String method1( ) {
   doSomething( );
   return b.method1( );
   }
   public void method2(int i) {
   doSomethingElse(i);
   b.method2(i);
}
```

POST:
// 'result' will be generated since B.method1 returns a String

```
public String method1( ) {
  return "hello"+result;
}
public void method2(int i) {
  doSomethingElse(i);
}
``` becomes:

```
// the manually written code can use
// 'result' or ignore it
public String method1( ) {
String result=b.method1( );
return "hello"+result;
}
public void method2(int i) {
b.method2(i);
doSomethingElse(i);
}
```

Those skilled in the art should readily appreciate that the programs and methods for generating delegation code structures as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. Such delivery may be in the form of a computer program product having a computer readable medium operable to store computer program logic embodied in computer program code encoded thereon, for example. The operations and methods may be implemented in a software executable object or as a set of instructions embedded in an addressable memory element. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for generating delegation code structures has been particularly shown and described with references to embodiments thereof, it will be understood by those skilled in the art that various changes in form and details may be made therein without departing from the scope of the invention encompassed by the appended claims.

What is claimed is:

1. In a software development environment including a plurality of software classes defined by coded statements indicative of instructions, a method for defining an invocation sequence comprising:
    parsing a definition of instructions in a software object corresponding to one of the plurality of software classes, the software object including a set of methods defined by the coded statements, the methods operable to perform application tasks;
    identifying, in the parsed instructions, a directive indicative of a delegation class, the delegation class including a set of delegation methods responsive to delegation from the software object;
    referencing a predetermined sequence of coded statements corresponding to the directive, the predetermined sequence operable to define an invocation of the methods in the delegation class;
    iterating, through each of the methods in the delegation class; and
    generating, in the software object, for each method in the delegation class, a signature operable to invoke the method from the parsed software object.

2. The method of claim 1 further comprising defining the predetermined sequence as an annotation of coded statements operable to:
    identify parameters of a particular method in the delegation class;
    receive control from the software object for invoking the particular method in the delegation class; and
    call the particular method in an object corresponding to an instantiation of the delegation class.

3. The method of claim 2 wherein the directive defines an annotation type, the annotation type operable to generate code corresponding to the methods in the delegation class, the predetermined sequence further operable for receiving annotated values corresponding to compile time constants.

4. The method of claim 1 wherein the methods in the delegation class are delegated methods for performing tasks on behalf of the software object, further comprising:
    selectively generating a signature for invoking the delegated methods;
        omitting a signature for a particular one of the delegated methods; and
        defining coded instructions for explicitly invoking the delegation method corresponding to the omitted signature.

5. The method of claim 4 wherein the software object is defined by an invoking class operable to invoke the delegated methods via a delegation, further comprising superceding the delegation by defining a method in the invoking class.

6. The method of claim 4 wherein the software object is defined by an invoking class operable to invoke the delegated methods via a delegation, further comprising defining a superceding method in the invoking class, the superceding method having the same name as a delegated method in the delegation class and operable to receive control upon an invocation from the invoking class.

7. The method of claim 5 wherein the predetermined sequence includes coded statements defined prior to runtime as compile time constants.

8. The method of claim 7 Wherein the delegation class provides an operation not available in the invoking class, each of the delegated methods defined via a signature in the invoking class.

9. The method of claim 8 wherein the delegation class provides a method not inherited from the invoking class.

10. The method of claim 5 further comprising defining a delegation policy indicative of an ordering of resolving the methods in the delegation class with a corresponding method in the parsed software object invoking the delegation class.

11. The method of claim 10 wherein the delegation policy includes at least one of
    an override qualifier directing the delegation method to override a corresponding method in the delegation class;
    a pre-processing qualifier directing the resolution of the delegation method in the delegation class before attempting a resolution in the invoking class; and
    a post-processing qualifier directing the resolution of the delegation method in the delegation class after attempting a resolution in the invoking class.

12. The method of claim 2 further comprising defining a visibility attribute indicative of accessibility of the methods in the delegation class, the visibility modifiers including at least one of public, protected, and private.

13. A computing device for defining an invocation sequence in a software development environment having a plurality of software classes defined by coded statements indicative of instructions, the computing device comprising:
- an object integrator operable to parse a definition of instructions in a software object corresponding to one of the plurality of software classes, the software object including a set of methods defined by the coded statements;
- an annotation processor operable to identify, in the parsed instructions, a directive indicative of a delegation class, the delegation class including a set of delegation methods responsive to delegation from the software object;
- a delegation processor responsive to the annotation processor operable to reference a predetermined sequence of coded statements corresponding to the directive, the predetermined sequence operable to define an invocation of the methods in the delegation class, the delegation processor operable to;
- iterate, through each of the methods in the delegation class; and
- generate, in the software object, for each method in the delegation class, a signature operable to invoke the method from the parsed software object.

14. The device of claim 13 wherein the annotation processor is further operable to receive the predetermined sequence as an annotation of coded statements, the coded statements including instructions to:
- identify parameters of a particular method in the delegation class;
- receive control from the software object for invoking the particular method in the delegation class; and
- invoke the particular method in an object corresponding to an instantiation of the delegation class.

15. The device of claim 14 wherein the directive defines an annotation type, the annotation type operable to generate code corresponding to the methods in the delegation class, the predetermined sequence further operable for receiving annotated values corresponding to compile time constants, the annotated values including an indication of the delegation class.

16. The device of claim 13 wherein the methods in the delegation class are delegated methods for performing tasks on behalf of the software object, the delegation processor further operable to:
- selectively generate a signature for invoking the delegated methods;
- omit a signature for a particular one of the delegated methods; and
- define coded instructions for explicitly invoking the delegation method corresponding to the omitted signature;
- the software object defined by an invoking class operable to invoke the delegated methods via a delegation, further operable to supercede the delegation by defining a method in the invoking class.

17. The device of claim 16 wherein the predetermined sequence includes coded statements defined prior to runtime as compile time constants, the delegation class providing an operation not available in the invoking class, each of the delegated methods defined via a signature in the invoking class, the delegation class operable to provide a method not inherited from the invoking class.

18. The device of claim 13 wherein the predetermined sequence is operable to define a delegation policy indicative of an ordering of resolving the methods in the delegation class with a corresponding method in the parsed software object invoking the delegation class, the delegation policy including at least one of
- an override qualifier directing the delegation method to override a corresponding method in the delegation class;
- a pre-processing qualifier directing the resolution of the delegation method in the delegation class before attempting a resolution in the invoking class; and
- a post-processing qualifier directing the resolution of the delegation method in the delegation class after attempting a resolution in the invoking class.

19. The device of claim 18 wherein the predetermined sequence is operable to define a visibility attribute indicative of accessibility of the methods in the delegation class, the visibility modifiers including at least one of public, protected, and private.

20. A computer program product having computer program code including set of processor based instructions encoded on a computer readable for defining an invocation sequence in a software development environment comprising medium comprising:
- computer program code for parsing a definition of instructions in a software object, the object including a set of operations, the operations operable to perform application tasks;
- computer program code for identifying, in the parsed instructions, a directive indicative of a delegation class, the delegation class including a set of delegation operations responsive to delegation from the software object;
- computer program code for iterating, through each of the methods in the delegation class; and
- computer program code for generating, in the software object, for each delegation method in the delegation class, an invocation object having a signature operable to invoke the delegation method from the parsed software object.

* * * * *